(12) United States Patent
Watson (10) Patent No.: US 8,454,035 B2
(45) Date of Patent: *Jun. 4, 2013

(54) SULKY

(75) Inventor: Curtis G. Watson, Garden City, MI (US)

(73) Assignee: U.F.O. Racing, Inc., Aston, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/296,739

(22) Filed: Nov. 15, 2011

(65) Prior Publication Data

US 2012/0056394 A1 Mar. 8, 2012

Related U.S. Application Data

(63) Continuation of application No. 13/073,089, filed on Mar. 28, 2011.

(60) Provisional application No. 61/318,025, filed on Mar. 26, 2010.

(51) Int. Cl.
*B62C 1/08* (2006.01)

(52) U.S. Cl.
CPC .................................... *B62C 1/08* (2013.01)
USPC ................................................ 280/63

(58) Field of Classification Search
CPC ........................................................ B62C 1/08
USPC ............. 280/63, 65, 47.131, 47.15; 54/39.1; D12/19
See application file for complete search history.

(56) References Cited

U.S. PATENT DOCUMENTS

| | | | | |
|---|---|---|---|---|
| 757,575 A | * | 4/1904 | St. Clair | 280/65 |
| 2,896,962 A | * | 7/1959 | Gaines et al. | 280/63 |
| 3,163,438 A | * | 12/1964 | Bliss, Jr. | 280/43 |
| 3,388,921 A | * | 6/1968 | Pickard | 280/63 |
| 3,415,533 A | * | 12/1968 | Bliss, Jr. | 280/43 |
| 3,907,325 A | * | 9/1975 | Gaines et al. | 280/657 |
| 4,033,598 A | * | 7/1977 | King | 280/63 |
| 4,071,257 A | * | 1/1978 | Discount | 280/63 |
| 4,078,829 A | * | 3/1978 | Davis | 280/657 |
| 4,095,815 A | * | 6/1978 | Mitchell | 280/63 |
| 4,135,730 A | * | 1/1979 | Yunick | 280/65 |
| 4,313,611 A | * | 2/1982 | Heinze et al. | 280/63 |
| 4,326,367 A | * | 4/1982 | Cashman | 54/2 |
| 4,387,908 A | * | 6/1983 | Kroger et al. | 280/63 |
| 4,698,032 A | | 10/1987 | Hill | |
| 4,817,975 A | * | 4/1989 | Saraydar | 280/63 |
| 4,863,180 A | * | 9/1989 | Guarino et al. | 280/63 |
| 4,993,728 A | * | 2/1991 | Loporcaro et al. | 280/63 |

(Continued)

FOREIGN PATENT DOCUMENTS

WO    WO93/19969    10/1993

*Primary Examiner* — Hau Phan
*Assistant Examiner* — Jacob Meyer
(74) *Attorney, Agent, or Firm* — The Weintraub Group, P.L.C.

(57) ABSTRACT

The present invention pertains to a sulky for horse-drawn harness racing including a frame, a seat, and a pair of wheels. The frame comprises an arch, a fork assembly secured to each end of the arch, a pair of spaced-apart rails extending forwardly from the arch in a direction of travel, and a stirrup secured to each rail. Each fork assembly comprises a pair of spaced-apart legs and an axle. Each wheel is positioned between a respective pair of legs and rotatably secured to the axle. The frame may also include a support strut extending between a respective fork assembly and rail to provide additional strength to the frame.

1 Claim, 9 Drawing Sheets

U.S. PATENT DOCUMENTS

| | | | |
|---|---|---|---|
| 5,062,652 A * | 11/1991 | Burke | 280/64 |
| 5,183,279 A * | 2/1993 | Acerno et al. | 280/63 |
| 5,308,092 A * | 5/1994 | Kiraly | 278/118 |
| 5,607,170 A * | 3/1997 | Capjon et al. | 280/63 |
| 5,857,686 A * | 1/1999 | Millington | 280/63 |
| 6,029,988 A * | 2/2000 | Edwards | 280/152.2 |
| 6,095,536 A * | 8/2000 | Stein et al. | 280/63 |
| 6,161,852 A * | 12/2000 | Bergling | 280/63 |
| 6,354,613 B1 * | 3/2002 | Stein et al. | 280/63 |
| 6,588,186 B2 * | 7/2003 | Knox | 54/69 |
| 7,578,510 B2 * | 8/2009 | Ross et al. | 280/63 |
| 2005/0023784 A1 * | 2/2005 | Harmer et al. | 280/63 |
| 2005/0212240 A1 * | 9/2005 | Harmer et al. | 280/63 |
| 2007/0262544 A1 * | 11/2007 | Ross et al. | 280/63 |
| 2011/0233883 A1 * | 9/2011 | Watson | 280/63 |

* cited by examiner

SULKY

CROSS REFERENCE TO RELATED APPLICATION

This application is a continuation of co-pending U.S. patent application Ser. No. 13/073,089, filed Mar. 28, 2011, which claims the benefit of U.S. Provisional Application 61/318,025, filed on Mar. 26, 2010, the entire disclosures of which are hereby incorporated by reference.

BACKGROUND OF THE INVENTION

1. Field of the Invention

The present invention is directed to a horse-drawn sulky. More particularly, the present invention is directed to a racing sulky for use in harness racing. Even more particularly, the present invention is directed to a racing sulky which is fully adjustable to fit any suitable horse or driver and which can be adjusted quickly and easily.

2. Description of the Prior Art

Harness racing with sulkies is a popular sport throughout the United States as well as other countries of the world. As understood by one having ordinary skill in the art, a sulky is a two-wheeled horse-drawn cart having a seat for the jockey, or driver, to sit atop. The frame includes a pair of spaced-apart rails extending forward to be harnessed to the horse.

Potential areas of improvement exist with current sulky designs. The two largest variable that can allow any given harness racing horse to post quicker times is to reduce the weight of the sulky, and reduce the distance the horse must run to finish the race. The present invention seeks to improve upon the prior art by addressing these areas of improvement.

However, it is believed that reducing the weight of a sulky in the prior art will unsafely compromise its structural integrity, thereby potentially leading to accidents that can injure both the driver and the horse if the sulky breaks during a race or practice.

Furthermore, in order to reduce the distance the horse must run to finish any given race on a course having turns, there exist sulky designs which have an offset arch and wheels which allow the horse to run closer to the inside of a turn, thereby reducing the overall distance of the race by several lengths. The arch and wheels are offset such that the inside wheel is positioned closer to the horse, thus allowing the horse to run closer to the inside of the turn. However, there are limitations to the degree that sulkies in the prior art can be offset before the inside wheel interferes with the horse during a race, which can potentially result in damage to the sulky or injury to the horse or driver.

Therefore, a need exists for a sulky with a compact and reinforced construction which is lighter than sulkies in the prior art, yet able to withstand the forces encountered during strenuous use, and which is able to allow the horse to race around the turns at a tighter radius in order to reduce the distance that must be ran to finish the race.

SUMMARY OF THE INVENTION

In a first embodiment hereof, the present invention provides a sulky comprising:

(a) a frame including an arch, a fork assembly secured to each end of the arch, a wheel rotatably secured to each fork assembly, a pair of spaced-apart rails extending forwardly from the arch in a direction of travel, a seat secured to the arch, and a stirrup secured to each rail;

(b) wherein the arch comprises a hollow elongated beam having a noncircular cross-section defined by a major inner axis and a minor inner axis, the arch including a tubular reinforcement member disposed within the hollow elongated beam, the reinforcement member having an outer diameter which is the same or less than the minor inner axis of the beam and dimensioned to fit securely within the beam.

In a second embodiment hereof, the present invention provides a sulky comprising:

(a) a frame including an arch having a midpoint β along the length thereof, a fork assembly secured to each end of the arch, a wheel rotatably secured to each fork assembly, a pair of spaced-apart rails extending forwardly from the arch in a direction of travel, a position along the arch which is equidistant from each rail being defined as α, a seat secured to the arch, and a stirrup secured to each rail;

(b) wherein both the seat and α are offset from the midpoint β more than 15.25 centimeters in a same direction.

Optionally the wheel can include a hub 38 having a reduced length which allows the fork assembly legs to be positioned closely together, thereby allowing the seat and the pair of rails to be offset to a degree which is unachievable in the prior art.

Optionally the stirrups and/or the seat can be positionally adjustable with respect to the arch, such as being secured to the sulky in a telescoping manner.

Optionally the distal end of each fork assembly can include four holes disposed in an array to allow the respective wheel to be attached in an up/down and forward/rearward arrangement to position the sulky for proper attachment to horses of various sizes.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

The following description of the preferred embodiment is merely exemplary in nature and is in no way intended to limit the invention, its application, or uses.

Figure 1:
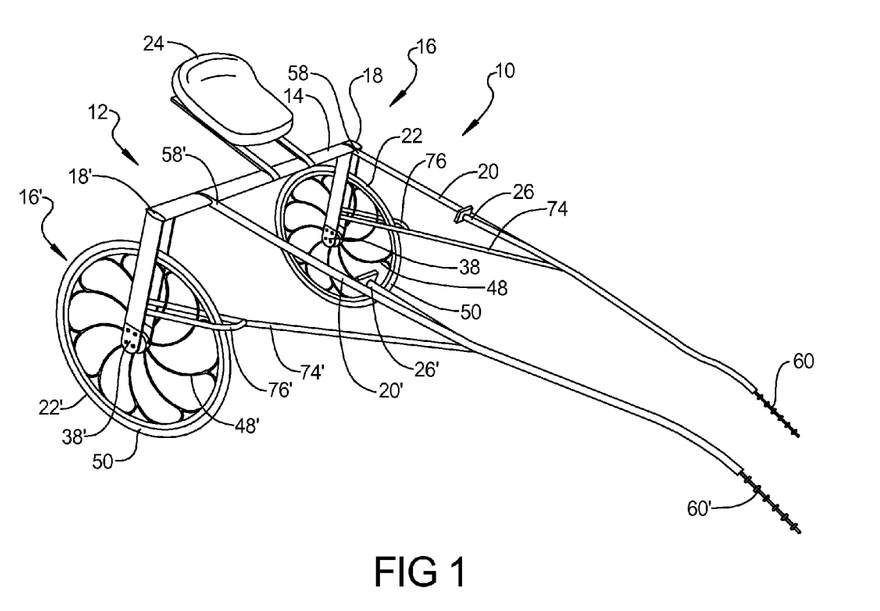
FIG. 1 is a perspective view of a sulky according to the present disclosure.

With reference to FIG. 1 of the drawings, a sulky constructed in accordance with the teachings of the present invention is generally identified by the reference numeral 10. The sulky 10 includes a frame 12 including an arch 14, a fork assembly 16,16' secured to each end 18,18' of the arch 14, and a pair of spaced-apart rails 20,20' extending forwardly from the arch 14 in the direction of travel. The sulky 10 also includes a wheel 22,22' rotatably secured to each fork assembly 16,16', a seat 24 secured to the arch 14, and a stirrup 26,26' secured to each respective one of the rails 20,20'.

Figure 2:
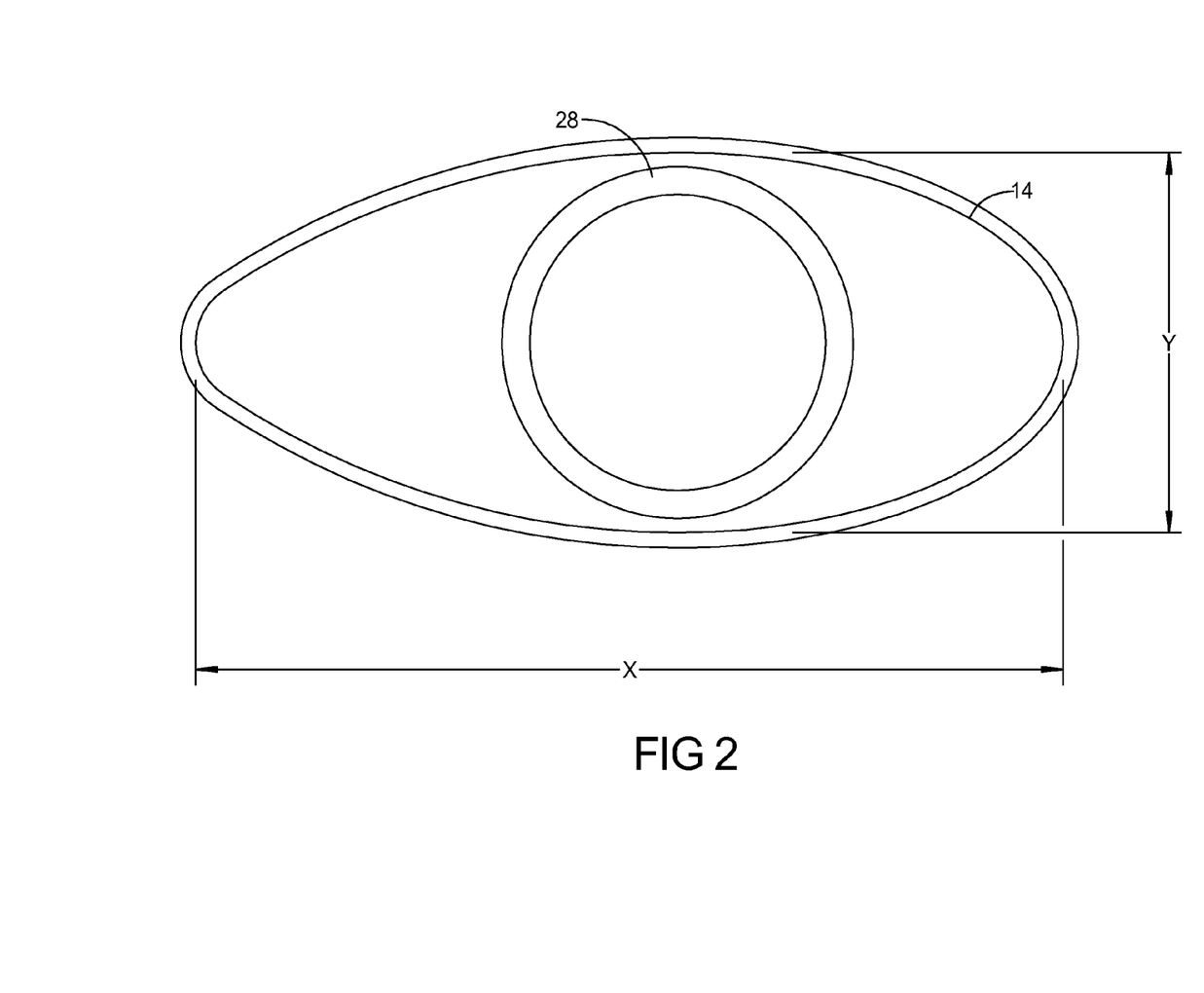
FIG. 2 is a cross-sectional view of a preferred embodiment of the arch.

The arch 14 is an elongated hollow beam which substantially extends the width of the sulky 10. The arch 14 has opposed ends 18,18', and a midpoint β along the length thereof. As understood by one having ordinary skill in the art, "arch" is a term of art and the arch 14 may or may not be actually arched or bowed. However, it is known to preload, or bend, an arch with a degree of camber so that it flexes a predetermined amount when the driver sits atop the sulky. As used herein, the arch 14 is not limited to having a bowed or arched construction, but is envisioned as contemplating either configuration. In addition, the arch 14 can comprise any suitable cross-sectional shape, such as an ellipse or the like. As shown in FIG. 2, the geometry of the cross-sectional area is defined by an inner major axis x and an inner minor axis y. The inner major and inner minor axes x,y represent the maximum interior diameters in their respective direction. In an exemplary embodiment, the arch 14 is preferably tear-drop shaped in cross-section.

Optionally a tubular reinforcement member 28 can be disposed inside the arch 14 and is co-extensive therewith. Preferably, the reinforcement member 28 has a substantially circular cross-section and has an outer diameter which is substantially the same or slightly less than the inner minor axis y of the arch 14, such that there is tangential contact between the two. The arch 14 and the reinforcement member 28 are formed from any suitable material that is well-known in the art, including metal, a composite material, or the like. The tubular reinforcement member 28 strengthens and reinforces the arch 14, making it capable of withstanding forces acting on the arch 14, particularly near the midpoint β where the arch 14 supports the weight of the driver.

Figure 7:
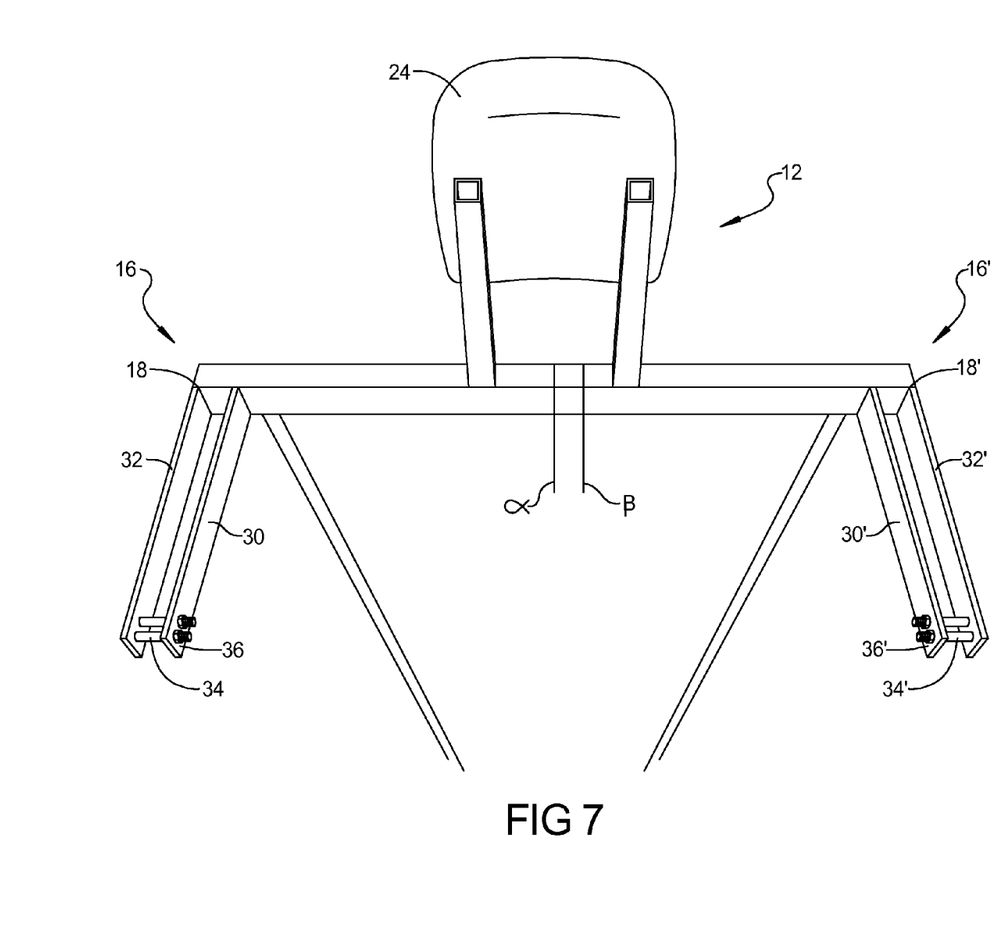
FIG. 7 is a view of only the frame including reference points defining the offset of the rails and seat with respect to the arch and fork assemblies.

Referring now to FIG. 7, each fork assembly 16,16' includes an inner leg 30,30' and an outer leg 32,32' which is fixedly mounted or secured to the arch 14 and extends generally downwardly. An axle 34,34' is attached between the inner and the outer legs 30,30',32,32' at a distal lower ends 36,36', etc. thereof, and a respective one of the wheels 22,22' is rotatably secured to a respective one of the axles 34,34'.

Since the fork assembly 16,16' and wheel 22,22' on each side of the sulky 10 are the same, the following discussion is made with reference to only one of the two sides.

The outer leg 32 is positioned closer to the end 18 of the arch 14, while the inner leg 30 is positioned inward along the arch 14, and being at least sufficiently distanced from the outer leg 32 to allow the wheel 22 to be positioned therebetween. Preferably, the inner leg 30 and outer leg 32 are spaced in parallel at a distance of about 2 inches (5.08 cm) to about 4 inches (10.16 cm) apart to provide a very compact construction of the fork assembly 16. The compact spacing of the inner and outer legs 30,32 results in an eighth of an inch clearance between a hub 38 of the wheel 22 and the inner and outer legs 30,32. Each leg 30,32 comprises an elongated hollow beam which is preferably also tear-drop shaped in cross-section. Each leg 30,32 may optionally include a reinforcement member disposed therein (not shown), although preferably the reinforcement member is not provided with each leg 30,32.

Figure 3:
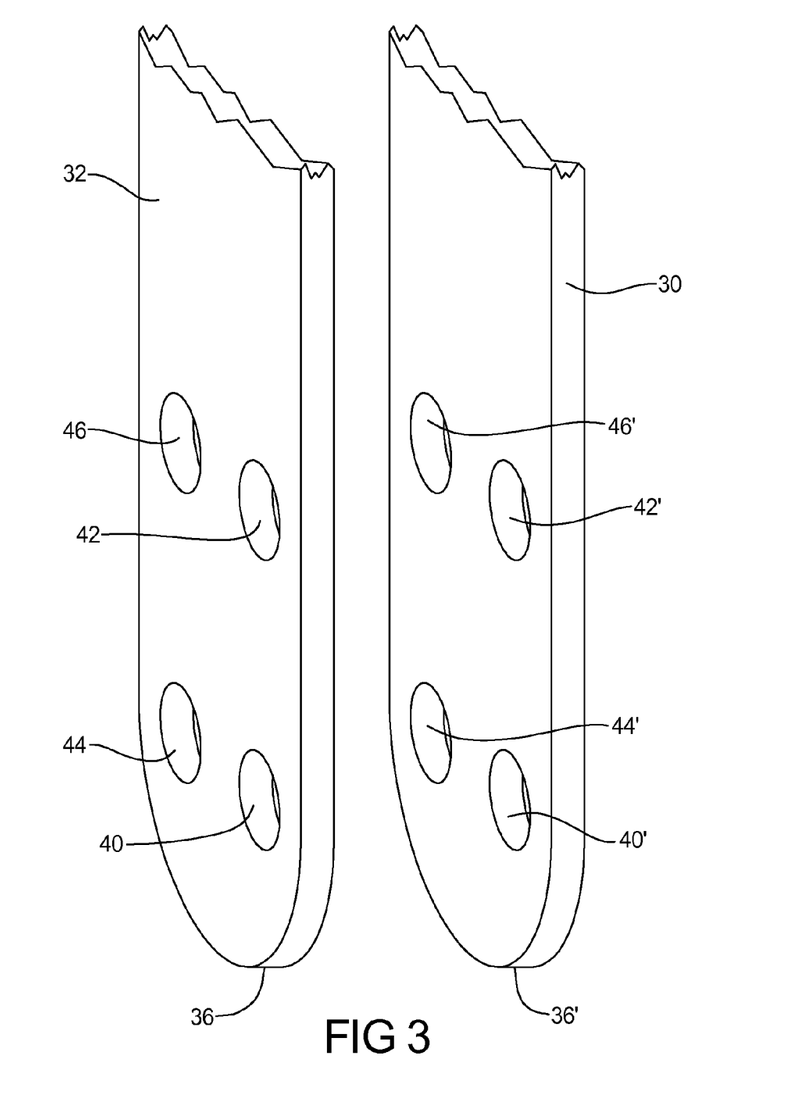
FIG. 3 is an enlarged view showing the aperture configuration according to the present disclosure.

As shown in FIG. 3, the distal ends 36,36', etc. of each of the inner and outer legs 30,32 include at least a first and second apertures, 40,40' and 42,42', respectively, for securing the axle 34 to the legs 30,32. The first apertures 40,40' of the inner and outer legs 30,32 are coaxially aligned, and the second apertures 42,42' are also coaxially aligned. The first and second apertures 40,42 are positioned linearly from each other such that the first apertures 40 are closer to the distal end 36 of the inner leg 30 and the outer leg 32 than the second apertures 42. The provision of the first and second apertures 40,42 allows the sulky 10 to be raised or lowered to adjust for horses of varying heights, thereby allowing the sulky 10 to be used with any harness racing horse.

Optionally, the distal end 36,36', etc. of each leg 30,32 can include three or more apertures, with at least two of the apertures positioned non-linearly with each other to provide further adjustability of the sulky 10, wherein the amount of weight placed on the horse can be varied by attaching the axle 34 to a forward or rearward aperture. Preferably, an array of four apertures including a third aperture 44 and fourth aperture 46 can be provided so that both height and weight can be adjusted.

Figure 4:
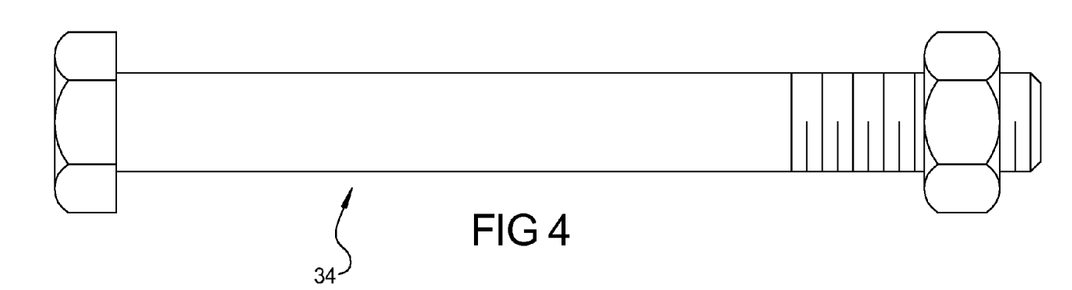
FIG. 4 shows an exemplary embodiment of the axle according to the present invention.

As shown in FIG. 4, each axle 34,34' comprises any suitable type of axle which is well-known for use with sulkies, although the axles 34,34' should be narrower than conventional axles to accommodate for the compact fork assemblies 16,16'.

Figure 5:
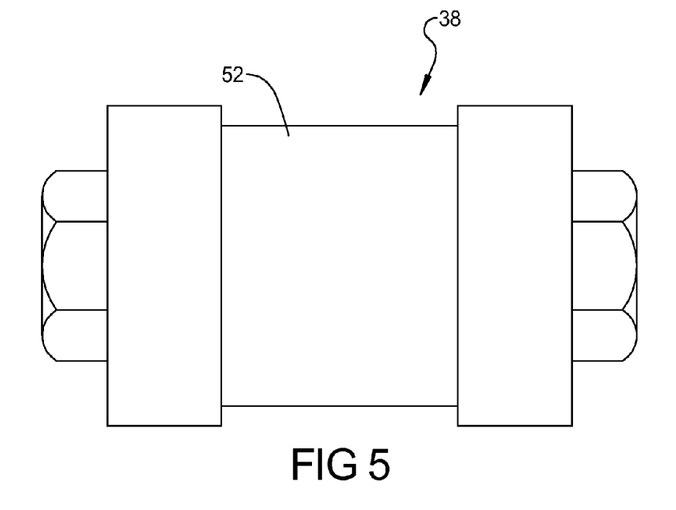
FIG. 5 shows an exemplary embodiment of the hub of the wheel.
Figure 6:
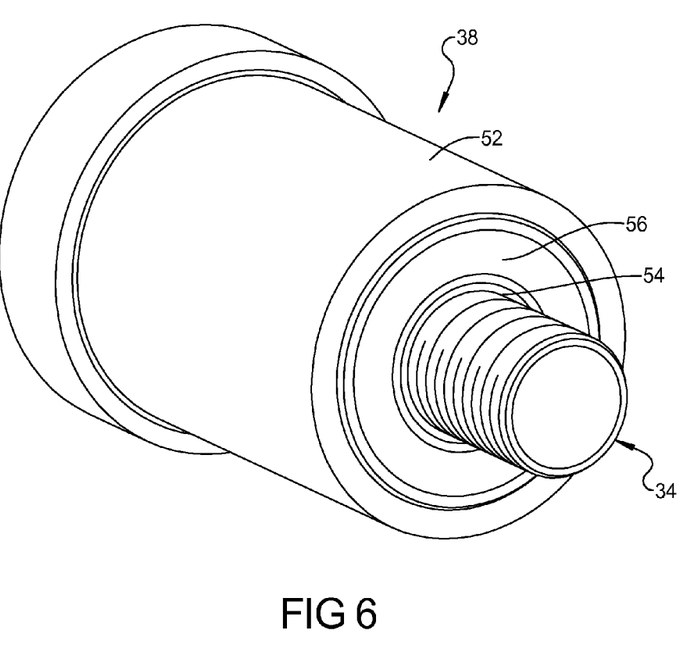
FIG. 6 shows an exemplary embodiment of the hub is partial disassembly showing the internal components thereof.

A wheel 22 is rotatably mounted to each of the axles 34,34'. Just as with sulky wheels that are well-known to those having ordinary skill in the art, the wheel 22 includes a hub 38, spokes 48, and a tire 50. The wheel 22 can optionally include discs not shown) over the spokes 48 to reduce drag. The spokes 48 and tire 50 are conventional and of the type which are well-known in the art. As shown in FIGS. 5 and 6, the hub 38 also has a construction which is primarily well-known in the art in that it has a rotor portion 52 which attaches to the spokes 48, a stator portion 54 which is secured to the axle 34, and a bearing housing 56 having bearings (not shown) between the rotor and stator portions 52,54 which allow the wheel 22 to spin. However, the hub 38 is shorter, or narrower, than conventional hubs which are well-known in the art. Preferably, the hub is about 2 inches to about 4 inches long, whereas a traditional hub is typically about 4.5 inches long. Because the width of the hub 38 has been decreased, the inner leg 30 can be moved closer to the outer leg 32, and the seat 24 and pair of rails 20,20' can be accordingly offset by that additional distance, thereby providing a sulky 10 which can be offset by a distance significantly greater than that which is known in the prior art.

Referring back to the frame 12 and FIG. 1, the frame 12 includes the pair of rails 20,20' which each have a proximate end 58,58' attached to the arch 14. The rails 20,20' extend forwardly in the direction of travel toward the horse. Any suitable type of rails which are well-known in the art can be used. Preferably, the rails 20,20' each comprise an elongated tube formed from metal, such as steel, and they are fixedly attached to the arch 14, such as by welding. The rails 20,20' may optionally have an elliptical cross-section.

As shown in FIG. 7, there is provided a reference position α which is located along the arch 14 at a position equidistant between the proximate end 58,58' of the rails 20,20'.

The distal ends 60 of the rails 20,20' are configured for harnessing a horse therebetween using conventional means.

Figure 8:
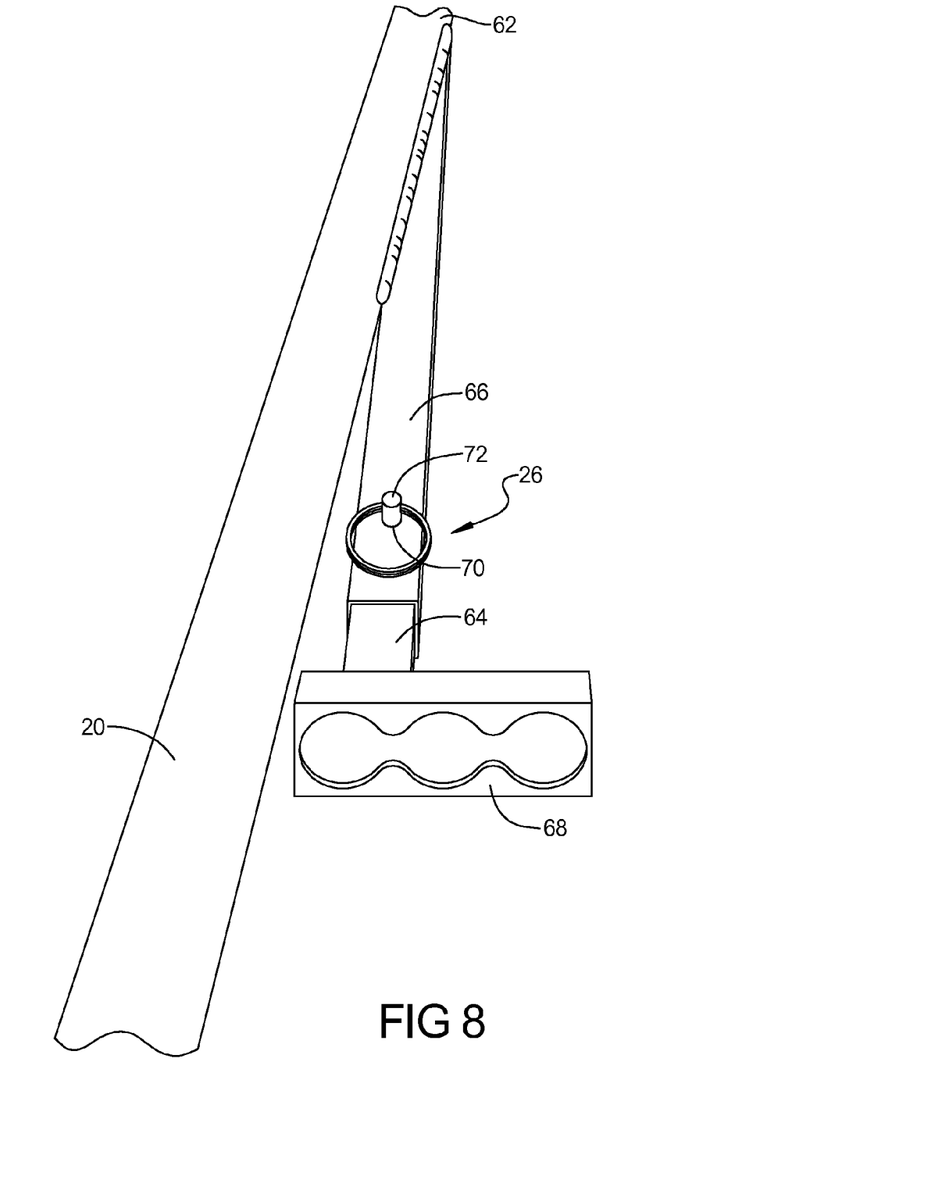
FIG. 8 shows an enlarged view of an exemplary stirrup.

A stirrup 26,26' is adjustably secured to each rail 20,20' so that the driver can place his or her feet upon during a race. As shown in FIG. 8, each stirrup 26,26' is secured to an inner side 62,62' of a respective rail 20,20'. Although conventional loop-style stirrups can be used herewith, preferably the stirrups 26,26' are adjustable in position with respect to the arch 14. In a preferred embodiment, each stirrup 26,26' includes a male portion 64, a female portion 66, and a foot rest 68. The male and female portions 64,66 telescopically engage with each other to adjust the cumulative length thereof. The male and female portions 64,66 preferably have a cross-sectional geometry which does not allow them to rotate with respect to each other, such as any suitable non-circular shape. Either of the male or female portions 64,66 is securely attached to the respective rail 20, while the other portion is attached to the foot rest 68 (preferably by welding).

For example, the female portion 66 can be welded to the rail 20 and include at least one hole 70 along its surface for receiving a suitable fastener 72, such as a cotter pin. The male portion 64 has the foot rest 68 attached onto one end, and inserts into the female portion 66 on the other end. The male portion 64 includes a plurality of linear holes (not shown) which are aligned with the at least one hole 70 on the female portion 66 so that the cumulative length of the male and female portions 64,66 can be adjusted by selecting the desired hole on the male portion 64. Preferably the foot rest 68 comprises a pedal having a contoured surface for receiving the driver's foot.

Figure 9:
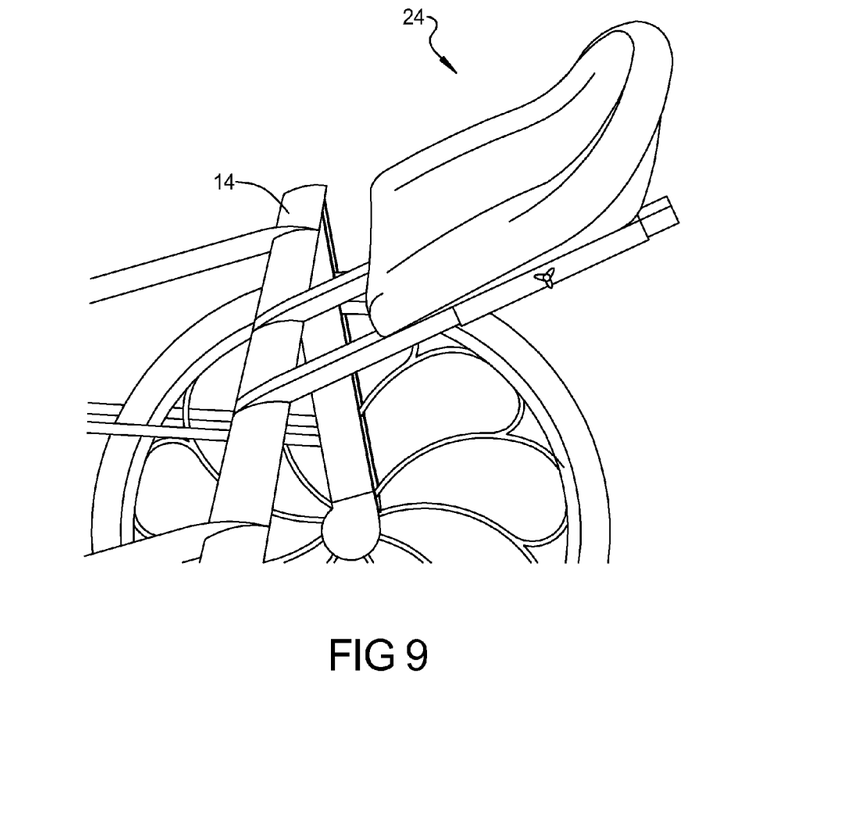
FIG. 9 shows an enlarged view of an exemplary seat.

As shown in FIG. 9, the seat 24 comprises any suitable type of seat which is well-known for use with a sulky. The seat 24 is adjustably secured to the arch 14 and supports the driver. The seat 24 is preferably positioned rearward of the arch 14 and between the fork assemblies 16,16'. The seat 24 is secured to the arch 14 by any conventional means, such as by welding, bolts, clamps or brackets. Preferably the seat 24 is adjustably secured to the arch 14 using the same type of adjustable telescoping components described above for the stirrups 26,26'.

Referring back to FIG. 7, importantly, the seat 24 and α (the equidistant point between the rails 20,20') are offset from the midpoint β of the arch 14 in the same direction at least 6 inches. It is known that an offset distance of up to 10 inches is attainable according to the present invention without interfering with the horse during a race. Upon further development of the present invention, it may be obtainable to safely achieve an offset distance of even greater than 10 inches.

Referring back to FIG. 1, the frame 12 can optionally include a strut member 74,74' connected to and extending between each respective one of the rails 20,20' and inner legs 30,30' to provide additional structural support to the frame 12. Each strut member 74,74' comprises an elongated tubular member which can be formed from any suitable material and connected to the rail and inner leg 30 using any suitable means. Preferably the strut members 74,74' are formed from metal and are welded to the rail 20 and inner leg 30. Even more preferably, the strut members 74,74' are formed from steel.

A support member 76,76' can also optionally be provided to extend between and be connected to each respective outer leg 32 and strut member 74 for additional support to the respective fork assembly 16. In order to extend beyond the wheel 22 positioned between the strut member 74 and the support member 76, the support member 76 is preferably "J" or "L" shaped. The support member 76 is also preferably formed from the same materials and utilizes the same connecting means as the strut member 74.

Although strut and support members are utilized in the prior art, it is known to connect the strut member 74 to the outer leg 32 and the support member 76 to the inner leg 30. By reversing this orientation in the present invention, the width of the sulky 10 forward of the wheels 22,22' is reduced, thereby allowing the sulky 10 to approach a turn at an even incrementally tighter radius and further reducing the distance the horse must run to complete a race.

Figure 10:
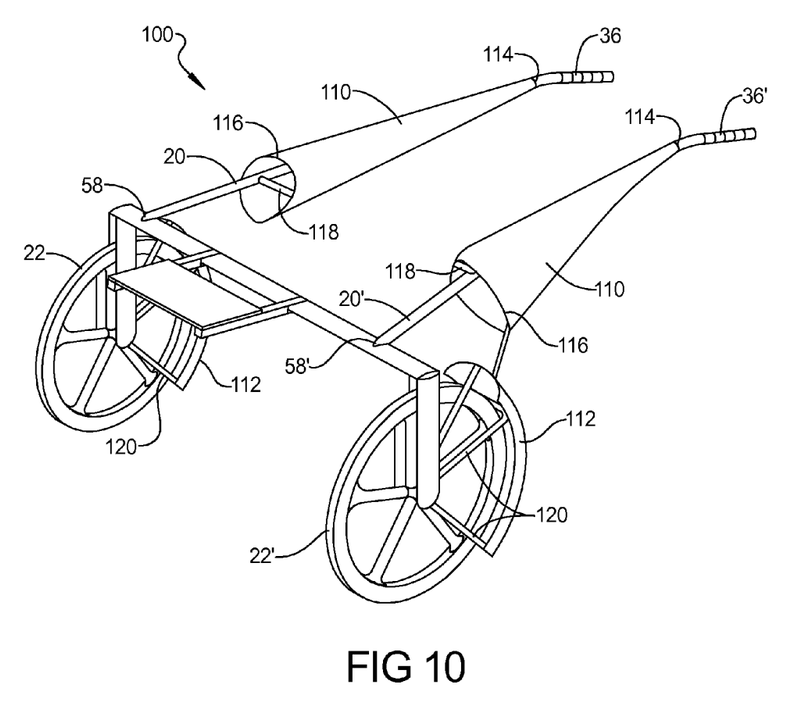
FIG. 10 shows an alternate embodiment according to the present invention.

With reference to FIG. 10, an alternate embodiment of the sulky is provided and is identified as reference numeral 100. The sulky 100 may have like components of the previously described sulky 10, but may further include shaft cones 110 and wheel shields 112. The shaft cones 110 have a generally conical shape and include a front end 114, a rear end 116 and a support bar 118. The shaft cones 110 are designed to reduce air resistance against the sulky 100 during use. The front end 114 of each cone is located near the distal ends 36,36' of the rails 20,20', respectively, and fits tightly around the rails 20,20'. The shaft cones 110 extend around the rails 20,20' toward the proximal ends 58,58' of the rails 20,20'. The rear end 116 has a larger diameter than the front end 114 to form the cone shape of the shaft cones 110. The rear end 116 is secured generally equidistant from the rails 20,20' by the support bar 118, which extends from a portion of the rear end 116 and is secured to either of the rails 20,2' by welding, bolts or other known methods. Although not shown it is understood that the cones will envelop the stirrups. When attached, the shaft cones 110 will direct air flow away from portions of the sulky 100 thereby decreasing air resistance against the sulky 100.

Also optionally provided are the wheel shields 112 which are a generally U-shaped rigid material and are positioned about a portion of the wheels 22,22' to direct air and debris away from the wheels 22,22'. The wheel shields 112 are located proximate the front portion of the wheels 22,22' and are attached to the frame 12 of the sulky 100 by a plurality of shield bars 120. The shield bars 120 extend from the wheel shield 112 and are secured to the legs 30,30',32,32' by known methods, such as by welding. Thus, the shield bars 120 position the wheel shields 112 close to and in front of the wheels 22,22' such that air flow and debris coming into contact with the wheels shields 112 during racing or exercise will be directed away from the wheels 22,22' and the legs 30,30',32, 32'.

Thus, the present disclosure provides a sulky having a reduced weight which maintains its structural integrity. Additionally, the sulky provides an additional offset distance and reduced width forward of the wheels to decrease the distance the horse must run. And even more, the sulky provides stirrups and a seat which are quickly and easily adjusted to accommodate drivers of various sizes. The sulky also provides fork assembly legs having a plurality of apertures for axle-attachment to vary the height of the sulky and the weight placed on the horse. Thus, the improved sulky is superior over the prior art in both performance and accommodation to both the driver and the horse.

As used herein, the terms "forward" and "rearward" are intended to reference the direction of travel of the sulky 10. Likewise, "inner" and "outer" are made in reference of the central longitudinal axis extending in the forward and rearward direction.

It is to be appreciated by one having ordinary skill in the art that the foregoing discussion discloses and describes merely exemplary embodiments of the present invention. One skilled in the art will recognize from the discussion, and from the accompanying drawings and claims, that various changes, modifications and variations may be made therein without departing from the spirit and scope of the invention as defined in the following claims.

What is claimed is:

1. A sulky comprising:
    (a) a frame including an arch, a fork assembly secured to each end of the arch, a wheel rotatably secured to each fork assembly, a pair of spaced-apart rails extending forwardly from the arch in a direction of travel, each rail having a proximate end that is proximate to and attached to the arch, and a position along the arch which is equidistant from the proximate ends of the rails being defined as α, a seat secured to the arch, and a stirrup secured to each rail;
(b) wherein a midpoint β is defined along the length of the arch, and both the seat and α are offset more than 15.25 centimeters in a same direction from the midpoint β.

* * * * *